(12) United States Patent
Pachai et al.

(10) Patent No.: US 10,974,277 B2
(45) Date of Patent: Apr. 13, 2021

(54) ROTOR BLADE COATING

(71) Applicant: MUEHLHAN AG, Hamburg (DE)

(72) Inventors: Vandad Pachai, Kolding (DK); Andreas Momber, Hamburg (DE)

(73) Assignee: MUEHLHAN AG, Hamburg (DE)

( * ) Notice: Subject to any disclaimer, the term of this patent is extended or adjusted under 35 U.S.C. 154(b) by 0 days.

(21) Appl. No.: 16/337,621

(22) PCT Filed: Sep. 22, 2017

(86) PCT No.: PCT/EP2017/073986
§ 371 (c)(1),
(2) Date: Mar. 28, 2019

(87) PCT Pub. No.: WO2018/060065
PCT Pub. Date: Apr. 5, 2018

(65) Prior Publication Data
US 2020/0047215 A1    Feb. 13, 2020

(30) Foreign Application Priority Data
Sep. 28, 2016   (DE) .......................... 102016118401.2

(51) Int. Cl.
*B05D 7/14*        (2006.01)
*B05D 7/00*        (2006.01)
(Continued)

(52) U.S. Cl.
CPC ................ *B05D 7/14* (2013.01); *B05D 7/50* (2013.01); *F03D 1/0675* (2013.01); *F03D 80/50* (2016.05);
(Continued)

(58) Field of Classification Search
CPC ......... F03D 1/0675; F03D 80/50; B05D 7/14; B05D 7/50; F05B 2240/30; F05B 2280/6011; Y02E 10/721
See application file for complete search history.

(56) References Cited

U.S. PATENT DOCUMENTS 5,947,418 A * 9/1999 Bessiere ................ B64D 15/14
                                                                  219/545
5,971,323 A * 10/1999 Rauch .................... B64D 15/12
                                                                  219/202
(Continued)

FOREIGN PATENT DOCUMENTS

CN        101235796         8/2008
CN        102767471        11/2012
(Continued)

*Primary Examiner* — Igor Kershteyn

(57) ABSTRACT

The present invention relates to a rotor blade which has a coating, to a corresponding method for producing the coating, and to a method for heating and/or deicing the outer surface of the rotor blade and/or an outermost layer applied onto the outer surface of the rotor blade. The task underlying the invention is to develop a functional multi-layered coating that constitutes a comprehensive protection against the various environmental influences. The task is accomplished by a rotor blade which has an outer surface and by an at least two-layered coating applied onto the outer surface, having a first adhesion-facilitating metal layer and/or a first adhesion-facilitating layer which has electric heating elements and a second metal layer, wherein the first adhesion-facilitating metal layer and/or the first adhesion-facilitating layer which has electric heating elements is arranged between the outer surface of the rotor blade and the second metal layer.

12 Claims, 1 Drawing Sheet

(51) Int. Cl.
  *F03D 80/50*    (2016.01)
  *F03D 1/06*    (2006.01)
(52) U.S. Cl.
  CPC ... *F05B 2240/30* (2013.01); *F05B 2280/6011* (2013.01)

(56) References Cited

U.S. PATENT DOCUMENTS

| | | | | |
|---|---|---|---|---|
| 6,612,810 | B1* | 9/2003 | Olsen | F03D 80/30 |
| | | | | 416/95 |
| 7,157,663 | B1* | 1/2007 | Kismarton | B64D 15/14 |
| | | | | 219/201 |
| 9,482,208 | B2* | 11/2016 | Loewe | F03D 1/0675 |
| 2005/0189345 | A1 | 9/2005 | Brunner | |
| 2012/0082783 | A1* | 4/2012 | Barnett | B05D 3/102 |
| | | | | 427/142 |
| 2013/0028738 | A1* | 1/2013 | Nordin | H05B 3/145 |
| | | | | 416/39 |

FOREIGN PATENT DOCUMENTS

| | | |
|---|---|---|
| DE | 102008006427 | 7/2008 |
| DE | 202012008475 | 11/2012 |
| EP | 2708740 | 3/2014 |
| WO | 2011018695 | 2/2011 |

* cited by examiner

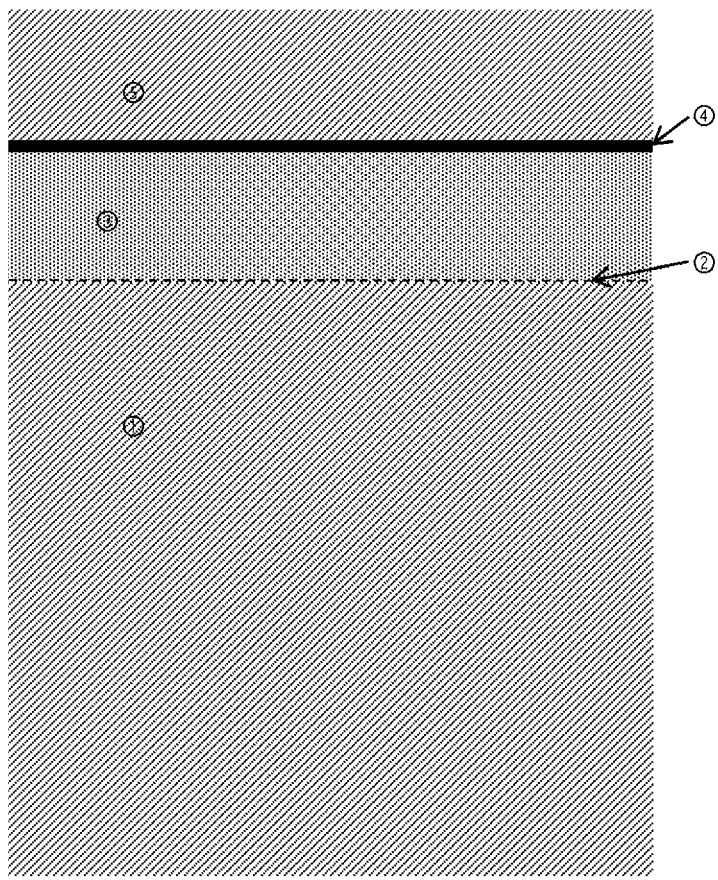

ROTOR BLADE COATING

TECHNICAL FIELD

The present invention relates to a rotor blade which has a coating, to a corresponding method for producing the coating, and to a method for heating and/or deicing the outer surface of the rotor blade and/or an outermost layer applied onto the outer surface of the rotor blade.

BACKGROUND

Background Information

As a result of the increased interest in renewable energies, the utilization of wind power by wind power plants is increasingly gaining importance.

A wind power plant essentially consists of tower constructions of 50 to 150 m high, a nacelle with the mechanical systems, and the rotor, which has a horizontal axis and—typically three—rotor blades.

In the framework of the continued development of such wind power plants, the ever larger rotor blades of modern power plants provide a steadily increasing output. It is therefore particularly important that a flawless operation of these power plants, requiring as little maintenance as possible, can be guaranteed. The rotor blades are exposed to severe environmental impact, however, such as snow, rain, heat, cold, and UV radiation. The wind power plants are also prone to being struck by lightning. Among other things, the consequences include erosion of the rotor blade edges, corrosion, damages caused by lightning strikes, and the formation of ice on the rotor blades, leading to an increased deterioration of the aerodynamic and static properties of the rotor blades. These changes not only negatively affect the efficiency of a wind power plant; they also lead to increased noise emissions and pose a risk to the stability of the wind power plant.

From prior art, various approaches are known for counteracting this environmental impact on the rotor blades. Thus it is known, for instance, that one or multiple metallic receptors can be inserted into the tip of the rotor blade and/or distributed across the rotor blade by way of lightning protection. A lightning conductor would then lead from the receptor located, for instance, at the tip of the blade, through the blade to the root of the blade. A lightning would then strike the receptor and be diverted via the lightning conductor in the interior of the blade, and then onward via the nacelle and down the shaft of the tower to the ground.

It is also known that various coatings, for instance coatings made of pigmented polyurethane, can be applied to the rotor blades in order to fend off the environmental impact factors and thus to minimize the risk of damage.

SUMMARY

The task underlying the invention is to develop a functional multi-layered coating that guarantees comprehensive protection against the various environmental influences as well as a simple and cost-effective production and inspection.

The task is accomplished by a rotor blade having an outer surface and an at least two-layered coating applied onto the outer surface, featuring a first adhesion-facilitating metal layer and/or a first adhesion-facilitating layer having electric heating elements, as well as a second metal layer, wherein the first adhesion-facilitating metal layer and/or the first adhesion-facilitating layer having electric heating elements is arranged between the outer surface of the rotor blade and the second metal layer. Advantageous further developments of such a rotor blade are that the second metal layer and/or every additional layer arranged on top of the second metal layer have a thermal conductivity of at least 100 to 400 W/(mK), and/or the second metal layer and every possibly existing additional layer have a combined thermal conductivity of at least 30 W/(mK), in particular at least 100 W/(mK), in particular 100 to 400 W/(mK). An outermost layer of the coating has a Vickers hardness of at least 100, and wherein in particular the second metal layer forms the outermost layer. The electric heating elements are mutually interconnected, specifically forming a network structure, and/or wherein the heating elements extend over a surface of at least 0.02% of the outer surface of the rotor blade. In the rotor blade, the first adhesion-facilitating metal layer and/or the first adhesion-facilitating layer having electric heating elements is at least in part a thermally sprayed layer, and/or the second metal layer is a layer applied by means of a cold gas spraying process. In the rotor blade, the second metal layer is electrically coupled with a lightning conduction device, and/or the first adhesion-facilitating metal layer and/or the first adhesion-facilitating layer having electric heating elements is coupled with at least one device for conducting current through the first adhesion-facilitating metal layer and/or through the electric heating elements, and/or the rotor blade comprises means for establishing an electrical connection between the first adhesion-facilitating metal layer and/or the first adhesion-facilitating layer having electric heating elements and at least one device for conducting current through the first adhesion-facilitating metal layer and/or through the electric heating elements, wherein the at least one device, the means, and/or the rotor blade in particular are arranged such that the current causes a heating of the second metal layer and/or a deicing of the outer surface of the rotor blade and/or of the outermost layer. The task is also solved by way of a method for coating the rotor blade according to the invention where the rotor blade has an outer surface, and wherein initially, a first adhesion-facilitating metal layer and/or a first adhesion-facilitating layer having electric heating elements is applied onto the outer surface, and subsequently, a second metal layer is applied such that the first adhesion-facilitating metal layer and/or the first adhesion-facilitating layer having electric heating elements is arranged between the outer surface and the second metal layer, wherein the second metal layer is applied by means of a cold gas spraying process. Advantageous further developments of this method include that the second metal layer and/or every additional layer applied onto the second metal layer have a thermal conductivity of at least 100 to 400 W/(mK), and/its and/or the second metal layer and every possibly existing additional layer have a combined thermal conductivity of at least 30 W/(mK), in particular at least 100 W/(mK), in particular 100 to 400 W/(mK). The method further includes that an outermost layer of the coating has a Vickers hardness of at least 7, and wherein in particular the second metal layer forms the outermost layer. The application of the first adhesion-facilitating layer having electric heating elements comprises the following steps: the application of the electric heating elements onto the outer surface of the rotor blade, and the application of an adhesion-facilitating material onto the electric heating elements and/or onto the outer surface of the rotor blade. The first adhesion-facilitating metal layer and/or the first adhesion-facilitating layer having electric heating elements is applied at least in part by means of thermal spraying, and/or wherein the metallic second layer is applied by means of a cold gas spraying process. The method further includes that the second metal layer is electrically coupled with a lightning conduction device, and/or the first adhesion-facilitating metal layer and/or the first adhesion-facilitating layer having heating elements is coupled with at least one device for conducting current through the first adhesion-facilitating metal layer and/or through the electric heating elements, and/or means are generated for electrically coupling the first adhesion-facilitating metal layer and/or the first adhesion-facilitating layer having electric heating elements to at least one device for conducting current through the first adhesion-facilitating metal layer and/or through the electric heating elements, wherein the at least one device, the means, and/or the rotor blade in particular are arranged such that the current causes a heating of the second metal layer and/or a deicing of the outer surface of the rotor blade and/or of the outermost layer. An additional aspect of the invention is a method for heating and/or deicing the outer surface of the rotor blade according to the invention and/or the outermost layer applied to the outer coated surface of the rotor blade according to the invention wherein the rotor blade features an at least two-layered coating applied to the outer surface, which comprises a first adhesion-facilitating metal layer and/or a first adhesion-facilitating layer having electric heating elements, as well as a second metal layer, wherein the first adhesion-facilitating metal layer and/or the first adhesion-facilitating layer having electric heating elements is arranged between the outer surface of the rotor blade and the second metal layer, wherein at least one voltage is applied to the first adhesion-facilitating metal layer and/or to the first adhesion-facilitating layer having electric heating elements, such that current flows through the first adhesion-facilitating metal layer and/or through the electric heating elements, thus causing a heating of the second metal layer and/or the deicing of the outer surface of the rotor blade and/or of the outermost layer. The task is further solved by a wind power plant featuring a tower and a nacelle and at least two, in particular three, rotor blades that are fastened to the nacelle so as to be rotatable around a joint axis and/or coated rotor blades.

The approach according to the invention is that the outer surface of a rotor blade features an at least two-layered coating, in particular one applied on it directly, comprising a first adhesion-facilitating metal layer and/or a first adhesion-facilitating layer having electric heating elements, as well as a second metal layer, wherein the first adhesion-facilitating metal layer and/or the first adhesion-facilitating layer which has electric heating elements is arranged between the outer surface of the rotor blade and the second metal layer.

The first adhesion-facilitating layer can be understood here as either a first adhesion-facilitating metal layer or as a first adhesion-facilitating layer having electric heating elements. The at least two-layered coating therefore specifically features one as first adhesion-facilitating layer and a second metal layer.

The outer surface is in particular the outer surface of the uncoated rotor blade and/or the outermost glass and/or carbon fiber-reinforced plastic surface, in particular the outermost glass and/or carbon fiber-reinforced synthetic resin surface, of the rotor blade and/or of the uncoated rotor blade.

The first adhesion-facilitating metal layer and/or the first adhesion-facilitating layer, in particular a metallic layer or a layer featuring at least one electric heating elements, serves for the transition, and therefore for the facilitation of the adhesion, between the outer surface of the rotor blade, for instance a plastic surface that may be made out of glass and/or carbon fiber-reinforced synthetic resins such as epoxy, and the second metal layer. Furthermore, this first layer may function as a heat source for the heating or deicing of the outer surface of the rotor blade, the coating, and/or the outermost layer applied to the outer surface of the rotor blade according to the invention. Through the application of an electric voltage to the first adhesion-facilitating metal layer and/or to the electric heating elements of the first adhesion-facilitating layer, heat can be generated in the first adhesion-facilitating metal layer and/or in the electric heating elements of the first adhesion-facilitating layer. The second metal layer has a first function as a lightning receptor and conductor. In particular, the lightning is conducted by the second metal layer and by a lightning conductor in and/or on the rotor blade, for instance, and then conducted onward through the tower to the ground by way of an additional lightning conductor, for instance one that features a slip ring and a shielded lightning rod. Preferably, the coated area and/or the entire rotor blade has no lightning protection structure inside the rotor blade. The second metal layer has a second function as an erosion-resistant layer, and as such nevertheless makes possible the deicing of the rotor blade or of the coating and/or its outer layer by heating the first adhesion-facilitating layer.

An additional aspect of the invention is a method for coating a rotor blade with an outer surface, wherein in a first step a first adhesion-facilitating metal layer and/or a first adhesion-facilitating layer having electric heating elements is applied onto the outer surface, and in a second step a second metal layer is applied such that the first adhesion-facilitating metal layer and/or the first adhesion-facilitating layer having electric heating elements is arranged between the outer surface and the second metal layer, wherein the second metal layer is applied by means of a cold gas spraying process.

In general, a rotor blade may comprise a body with surfaces, defining a pressure side, a suction side, a front edge, and a rear edge, all of which extending between a tip of a rotor blade and a root of the rotor blade. The outer surface of the rotor blade consists of the total of these surfaces.

The rotor blade may also have a rotor blade tip, a root, a pressure side, a suction side, a front edge, and a rear edge in general, and the coating may extend from the tip of the rotor blade along the front edge in the direction of the root of the rotor blade, and/or the coating may extend from the front edge on both sides in the direction of the rear edge. It is preferred in particular for the coating in the method according to the invention to be applied from the tip of the rotor blade along the front edge in the direction of the root of the rotor blade and/or from the front edge on both sides in the direction of the rear edge.

It is particularly preferred that the coating extend at least over a quarter of the length of the front edge, starting from the tip of the rotor blade, more particularly preferred at least over half the length of the front edge, and/or that the coating extend from the front edge on both respective sides toward the rear edge, more particularly preferred at least over a quarter of the width of the pressure side and the suction side and/or in particular over a width of at least 0.2 meters. It is particularly preferred that the coating according to the method of the invention be applied over at least a quarter of the length of the front edge, starting from the tip of the rotor blade, more particularly preferred at least over half the length of the front edge, and/or from the front edge on both respective sides toward the rear edge, more particularly preferred at least over a quarter of the width of the pressure side and the suction side and/or in particular over a width of at least 0.2 meters.

The term coating may comprise a tightly adhering layer applied to the surface of component. This may either be a thin layer or a thick layer, or multiple interconnected layers.

The term electric heating element may comprise a metal sheet, metal fabric, and/or metal wires made out of or comprising copper, aluminum and/or bronze.

The first adhesion-facilitating metal layer may comprise or consist of a layer of copper, aluminum and/or bronze and/or of a layer consisting of copper, aluminum, and/or bronze, or of an alloy of one of these metals. The first adhesion-facilitating layer may further comprise or consist of a layer of copper, aluminum and/or bronze, for instance, and/or of a layer consisting of copper, aluminum, and/or bronze, or of an alloy of one of these metals.

In one embodiment, the second metal layer is applied directly onto the first adhesion-facilitating metal layer and/or onto the first adhesion-facilitating layer having electric heating elements, in other words, no additional layer is applied between the first adhesion-facilitating metal layer, or respectively the first adhesion-facilitating layer having electric heating elements, and the second metal layer. This applies in particular when apart from the heating elements, the first adhesion-facilitating layer featuring the heating elements is electrically insulating. Alternatively or additionally, an electrically insulating intermediate layer be provided or applied between the first adhesion-facilitating layer and the second metal layer. This intermediate layer features in particular a thickness that is smaller than the thickness of the first adhesion-facilitating layer and/or of the second metal layer.

In a different embodiment, a mechanically attenuating layer, in particular a shock-absorbing intermediate layer, is provided or applied between the first adhesion-facilitating layer and the second metal layer. This intermediate layer features in particular a thickness that is smaller than the thickness of the first adhesion-facilitating layer and/or of the second metal layer. It is embodied in particular in combination with the insulating intermediate layer as an intermediate layer that performs both functions.

In an additional advantageous variant, the second metal layer and/or every additional layer applied onto the second layer may have a thermal conductivity of at least 30 W/(mK), in particular of at least 50 W/(mK), in particular of at least 100 W/(mK), in particular of 100 to 400 W/(mK), and/or the total thermal resistance of the second metal layer and of every possibly existing additional layer combined may be less than $1\times10^4$ $(m^2K)/W$, in particular less than $1\times10^5$ $(m^2K)/W$, and/or the thermal conductivity of the second metal layer and of every possibly existing additional layer combined may be at least 30 W/(mK), in particular at least 100 W/(mK), in particular 100 to 400 W/(mK).

The term additional layer describes every layer arranged on the second metal layer that faces away from the first adhesion-facilitating metal layer or from the first adhesion-facilitating layer having electric heating elements, respectively.

Furthermore, an outermost coating layer may have a Vickers hardness of at least 100, in particular of 100 to 200, at a test force F of 10 kilogram-force in a test for 12 seconds. In particular, the second metal layer may form the outermost layer.

The term outermost layer describes the layer arranged on the second metal layer that faces away farthest from the first adhesion-facilitating metal layer or from the first adhesion-facilitating layer having electric heating elements, respectively.

The good thermal conductivity guarantees a good heat conduction from the first adhesion-facilitating metal layer and/or the first adhesion-facilitating layer having electric heating elements through the outermost layer, thus allowing for a particularly effective heating/deicing of the outer surface of the rotor blade and/or of the outermost layer. Due to its hardness, and in particular due to its simultaneous good deformability, the outermost layer also features a high erosion-resistance, thus protecting the rotor blade against erosion.

Furthermore, the second metal layer can be the outermost layer of the coated surface of the rotor blade. This allows for a particularly simple production with only a few process steps.

It is also advantageous if the coating extends over at least 10%, in particular over 20% of the outer surface of the rotor blade. This allows for a sufficient protection of the outer surface of the rotor blade against environmental impact.

In an additional advantageous variant, the coating may extend and/or be applied from the tip of the rotor blade along the front edge in the direction of the root of the rotor blade and/or from the front edge along both sides in the direction of the rear edge. The coating may extend and/or be applied in particular over at least one quarter of the length, in particular over at least half the length, more in particular over the 20% to 70% of the length of the front edge, starting from the tip of the rotor blade, and/or from the front edge along both respective sides in the direction of the rear edge over at least one quarter of the width of the pressure side and of the suction side, in particular over a width of 0.2 meters, more in over a width of 0.1 to 0.3 meters. Thus, the rotor blade is sufficiently protected against environmental impact, and the material used for the coating and therefore the production costs can be reduced further.

It is especially advantageous for the first 50 cm of the length of the rotor blade starting from the tip of the rotor blade to be coated, in particular the first 80 cm, and at least 80% of it, in particular all of it.

It is especially advantageous if the extent of the layers of the coating can be differentiated. In particular, the first adhesion-facilitating layer covers a greater area than the second metal layer. In particular the first adhesion-facilitating layer extends over at least 50% of the length of the rotor blade, in particular over at least 70% of the length of the rotor blade, and/or it is applied over at least 50% of the length of the rotor blade, in particular over at least 70% of the length of the rotor blade. It extends in particular from the tip of the rotor blade and/or is applied in particular starting from the tip of the rotor blade. The second metal layer extends in particular over 20% to 40% of the length of the rotor blade and/or it is applied in particular over 20% to 40% of the length of the rotor blade. It extends in particular from the tip of the rotor blade and/or is applied in particular starting from the tip of the rotor blade. In particular, both layers are therefore present in the coating and/or applied, and the first adhesion-facilitating layer extends further than the second metallic layer, and or the first adhesion-facilitating layer is applied further than the second metallic.

Furthermore, the electric heating elements can be mutually interconnected; they may specifically form a network structure, and/or the heating elements may extend over a surface of 0.02% of the outer surface of the rotor blade. Thus, a particularly uniform heat input may be realized via the coated outer surface of the rotor blade, and the outer surface of the rotor blade and/or the outermost layer may be uniformly heated/deiced in particular. This is advantageous both for the material behavior of the rotor blade and for the coating, at it minimizes the risk of thermal stress.

Furthermore, the first adhesion-facilitating metallic layer and/or the first adhesion-facilitating layer having electric heating elements may have a thickness of 35 to 90 µm, in particular of 50 to 75 µm, and/or be applied at such thickness. This allows for a sufficiently good facilitation of the adhesion and heat induction to be realized, while simultaneously using less material.

In a further advantageous variant, the first adhesion-facilitating metal layer and/or the first adhesion-facilitating layer having electric heating elements may at least in part be a thermally sprayed layer, and/or the second layer may be a layer applied by means of a cold gas spraying process.

Thus, a particularly low porosity, good bonding with the outer surface of the rotor blade or with the first layer, respectively, as well as freedom from cracks and a homogeneous micro-structure can be realized.

With thermal spraying, the materials intended for application as a coating are melted or fused inside or outside of a spray gun nozzle, accelerated in a gas flow in the form of spray particles, and pelted onto the surface of the component that is to be coated. The surface of the component is not melted, and it is thermally impacted only to a small degree. A layer is formed due to the fact that when the spray particles impinge on the surface of the component, they flatten, to a greater or smaller degree, depending on the process and the material, they adhere primarily as a result of mechanical interlocking, and build up the spray coating layer by layer.

In the cold gas spraying process, the coating material is applied in powdered form at a very high speed onto the surface of the component being coated. For these purposes, a process gas heated to a few hundred degrees is accelerated by expansion in a De Laval nozzle to a supersonic speed, after which the powdered particles are injected into the gas jet. The injected spray particles are thus accelerated to such a high speed that contrary to other thermal spray processes, and without preceding melting or fusing, they form a dense and solidly adhering layer as they collide with the substrate. The kinetic energy at the time of the impact is insufficient for a complete fusion of the particles. Generally, for a cold gas spraying process, the preferred gas temperature is below 200° F., and/or preferred particle speeds are above 50 ft/s, in particular above 100 ft/s, in particular above 150 ft/s. The cold gas spraying process allows layers to generate layers, or the thus generated layers distinguish themselves in particular by lower contamination, oxidation, and stress.

Preferably, the first adhesion-facilitating metal layer and/or the first adhesion-facilitating layer having electric heating elements is applied at least in part by means of molten bath spraying, wire arc spraying, plasma spraying, flame spraying, high velocity flame spraying, detonation spraying, laser spraying, and/or PTWA spraying. In particular, the injected spray particles are melted or fused inside or outside of the spray gun nozzle before the application of the first adhesion-facilitating metal layer and/or the first adhesion-facilitating layer having electric heating elements.

It is furthermore advantageous that the second metal layer consist of bronze, aluminum, copper, or alloys containing bronze, aluminum, and/or copper. Since these materials have the optimal combination of good thermal conductivity, good hardness properties, and good deformation properties, this simultaneously allows for particularly good erosion protection, a prevention of ice formation, or respectively, the removal of ice.

In a further advantageous variant, the second metal layer may be electrically coupled with a device for the conduction of lightning, and/or the first adhesion-facilitating metal layer and/or the first adhesion-facilitating layer having electric heating elements may be coupled with at least one device for conducting current through the first adhesion-facilitating metal layer and/or through the electric heating elements, and/or the rotor blade may comprise means for establishing an electrical connection between the first adhesion-facilitating metal layer and/or the first adhesion-facilitating layer having electric heating elements and at least one device for conducting current through the first adhesion-facilitating metal layer and/or through the electric heating elements, wherein the at least one device, the means, and/or the rotor blade in particular are arranged such that the current causes the heating of the second metal layer and/or the deicing of the outer surface of the rotor blade and/or of the outermost layer.

A device for diverting lightning may comprise a slip ring, for instance, or a lightning conductor in the rotor blade, and/or a grounding system.

In particular all the features described as advantageous with respect to the device are also procedurally advantageous for the method. In particular, a device according to the invention is used for the implementation of the method.

A third aspect of the invention is a method for heating and/or deicing the outer surface of a rotor blade and/or of an outermost layer applied onto the surface of the rotor blade, wherein the rotor blade features at least one two-layered coating, which comprises a first adhesion-facilitating metal layer and/or a first adhesion-facilitating layer having electric heating elements, as well as a second metal layer, wherein the first adhesion-facilitating metal layer and/or the first adhesion-facilitating layer which has electric heating elements is arranged between the outer surface of the rotor blade and the second metal layer, wherein a voltage is applied to the first adhesion-facilitating metal layer and/or to at least one electric heating element of the first adhesion-facilitating layer having electric heating elements, the voltage being at least such that current flows through the first adhesion-facilitating metal layer and/or through the at least one electric heating element, thus causing the heating of the second metal layer and/or the deicing of the outer surface of the rotor blade and/or of the outermost layer.

The task is also solved by a wind power plant featuring a tower and a nacelle and at least two rotor blades, in particular three rotor blades according to the invention and/or rotor blades coated according to the invention that are fastened to the nacelle so as to be rotatable around a joint axis. In particular, the wind power plant features a grounding conductor that can be and/or is connected with the second coating layer of at least one rotor blade, in particular one that is not inside the rotor blades, in particular one that is only outside of the rotor blades and/or is conducted through or formed by a coating of the rotor blades. The wind power plant features in particular a power supply and/or a connection to the grid that can be and/or is connected with the first layer of the coating of at least one rotor blade, in particular one that is adjustable, wherein the wind power plant is adapted, wherein a voltage of the power supply is applied to the first adhesion-facilitating metal layer and/or to at least one electric heating element of the first adhesion-facilitating layer having electric heating elements, the voltage of the power being at least such that current flows through the first adhesion-facilitating metal layer and/or through the at least one electric heating element, thus causing the heating of the second metal layer and/or the deicing of the outer surface of the rotor blade and/or of the outermost layer.

In particular, all the features described as advantageous with respect to the rotor blades are applicable to the wind power plant, and they are also procedurally advantageous for the heating and/or deicing method. In particular for the implementation of the heating and/or deicing method, a device according to the invention is used.

BRIEF DESCRIPTION OF THE SEVERAL VIEWS OF THE DRAWINGS

FIG. 1 exemplarily shows a possible structure as a partial section of a rotor blade.

DETAILED DESCRIPTION

FIG. 1 shows a cross section of a part of the rotor blade. A first part of the rotor blade 1 is identifiable, made out of a glass fiber-reinforced synthetic material. Without further coating, this glass fiber-reinforced synthetic material forms the outer surface 2. According to the invention, this surface is referred to as outer surface 2 even when a coating is present. Applied onto it is a first adhesion-facilitating layer 3. Applied onto that layer is an intermediate layer 4, onto which a second metal layer 5 is applied, which, after their application, form the outer surface of the coated rotor blade.

The invention claimed is:

1. A rotor blade having an outer surface and an at least two-layered coating applied onto the outer surface, wherein the at least two-layered coating comprises:
 a first adhesion-facilitating metal layer or a first adhesion-facilitating layer having electric heating elements;
 a second metal layer, wherein the first adhesion-facilitating metal layer or the first adhesion-facilitating layer having electric heating elements is arranged between the outer surface of the rotor blade and the second metal layer; and
 a mechanically attenuating layer being provided or applied between the first adhesion-facilitating metal layer and the second metal layer.

2. The rotor blade according to claim 1, wherein the second metal layer or every additional layer arranged on top of the second metal layer has a thermal conductivity of at least 100 to 400 W/(mK), or the second metal layer and every existing additional layer together have a combined thermal conductivity of at least 30 W/(mK).

3. The rotor blade according to claim 1, wherein an outermost layer of the coating has a Vickers hardness of at least 100.

4. The rotor blade according to claim 1, wherein the electric heating elements are mutually interconnected, wherein the heating elements extend over a surface of at least 0.02% of the outer surface of the rotor blade.

5. The rotor blade according to claim 1, wherein the first adhesion-facilitating metal layer the first adhesion-facilitating layer having electric heating elements is at least, in part, a thermally sprayed layer, or the second metal layer is a layer applied by a cold gas spraying process.

6. The rotor blade according to claim 1, wherein the second metal layer is electrically coupled with a lightning conduction device, or the first adhesion-facilitating metal layer or the first adhesion-facilitating layer having electric heating elements is coupled with at least one device for conducting current through the first adhesion-facilitating metal layer or through the electric heating elements, or the rotor blade comprises means for establishing an electrical connection between the first adhesion-facilitating metal layer or the first adhesion-facilitating layer having electric heating elements and at least one device for conducting current through the first adhesion-facilitating metal layer or through the electric heating elements, wherein the at least one device, the means, or the rotor blade are arranged such that the current causes a heating of the second metal layer or a deicing of the outer surface of the rotor blade or of the outermost layer.

7. A wind power plant featuring a tower and a nacelle and at least two rotor blades that are fastened to the nacelle so as to be rotatable around a joint axis or includes coated rotor blades according to claim 1.

8. The rotor blade according to claim 2, wherein the second metal layer and every existing additional layer together have a combined thermal conductivity of at least 100 W/(mK).

9. The rotor blade according to claim 8, wherein the second metal layer and every existing additional layer together have a combined thermal conductivity of 100 to 400 W/(mK).

10. The rotor blade according to claim 3, wherein the second metal layer forms the outermost layer.

11. The rotor blade according to claim 4, wherein the electric heating elements form a network structure.

12. The rotor blade according to claim 1, wherein the mechanically attenuating layer is a shock-absorbing intermediate layer.

* * * * *